United States Patent Office 3,290,280

Patented Dec. 6, 1966

1

3,290,280
QUATERNARY SALTS OF TRIAZENE AZO DYESTUFFS

Jacques Voltz, Basel, and Werner Bossard, Riehen, Switzerland, assignors to J. R. Geigy A.G., Basel, Switzerland
No Drawing. Filed Aug. 2, 1963, Ser. No. 299,477
Claims priority, application Switzerland, Aug. 15, 1962, 9,766/62
6 Claims. (Cl. 260—140)

The present invention concerns new water-soluble quaternary salts of triazenes, processes for the production thereof, processes for the dyeing of fibers consisting of polymeric and copolymeric acrylonitrile, and, as industrial product, the material dyed with these dyestuffs.

It has been found that valuable water-soluble quaternary salts of triazenes are obtained by (a) Coupling the diazonium compound of an amine of formula $$A{-}N{=}N{-}B{-}NH_2 \quad \text{(I)}$$

wherein A represents an aryl radical which may contain substituents which do not dissociate acid in water, and B represents an arylene radical which may contain substituents which do not dissociate acid in water, with a compound of formula

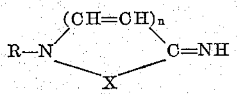

(II)

wherein X represents a divalent radical which completes the nitrogen-containing ring to a 5- or 6-membered ring, R represents a low alkyl radical and $n$ represents 0 or 1, to form a compound of formula

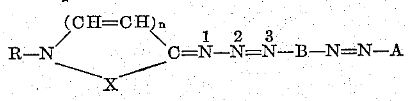

(III)

wherein A and B have the meanings given in Formula I and X, R and $n$ have the meanings given in Formula II, and (b) Converting the respective compounds of Formula III by reaction with an ester of a lower alkanol and a strong acid into a water soluble quaternary color salt of a structure defined within the resonance Formulas IV*a* and IV*b* below

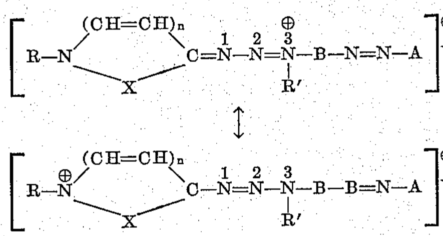

(IV*a*)

(IV*b*)

of which the latter type only is used hereinafter and in the appended claims to define said structure. In Formulas IV*a* and IV*b*, R′ represents a lower alkyl radical and Y represents an anion, and A and B have the meanings given in Formula I and X, R and $n$ have the meanings given in Formula II.

In the Formulas I, III and IV, A and B advantageously represent a phenyl or 1,4-phenylene radical which is either unsubstituted or contains substituents which do not dissociate acid in water.

In those compounds according to the invention in which the nitrogen-containing ring in Formulas II, III and IV is five-membered, the divalent radical X is, for example, the 1,3-propenylene radical —CH=CH—$CH_2$—, the vinyl-

2 amino radical —CH=CH—NH—, the vinylthio radical —CH=CH—S—, the vinyloxy radical —CH=CH—O—, or the radicals —CH=N—NH—, —N=CH—O—, —N=CH—S—, provided the index $n$ is 0. When X has these meanings, it thus completes a pyrrole, pyrazole or imidazole, thiazole, oxazole, 1,2,4-triazole, 1,3,4-oxidazole or 1,3,4-thiadiazole ring.

In those cases in which X is an o-phenylimino

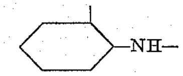

an o-phenylthio radical

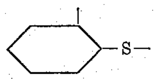

or o-phenyloxy radical

the hetero ring is an indazole or benzimidazole, benzthiazole or benzoxazole ring.

In those compounds according to the invention in which the nitrogen-containing ring in the formulas mentioned has six members, X is, for example, the butadienylene radical —CH=CH—CH=CH—, the styrylene radical

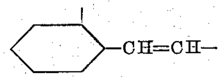

bound in o-position to the vinyl group or the propenylimino radical —CH=CH—CH=N—, provided $n$ is 0.

In the compounds according to the invention in which the index $n$ is 1, X represents, for example, the vinylene or the o-phenylene radical. In these meanings in the first case X completes a pyridine or a quinoline ring bound in the 2-position with the triazene group or an isoquinoline ring bound in the 1-position and a pyrimidine ring bound in the 2-position and, in the second case, it completes a pyridine and quinoline ring bound to the triazene group in the 4-position.

Advantageously X represents the radical

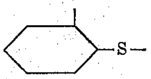

and $n$ is 0, i.e. the nitrogen-containing heterocycle in Formulas II, III and IV is a benzthiazole ring (or benzthiazoline ring) which may be substituted as defined.

As defined, the aromatic nuclei A and B can contain substituents which do not dissociate acid in water. The same is true of any aromatic nuclei present forming a component of X. Examples of substituents are: aliphatic, cycloaliphatic, araliphatic or aromatic groups, in particular lower alkyl groups such as the methyl or ethyl group, lower alkoxy, lower cycloalkoxy, aralkoxy, especially mononuclear carbocyclic-aryl-lower alkoxy, or aryloxy in particular mononuclear carbocyclic aryloxy groups, principally the methoxy or ethoxy group, also the hydroxyl group, acylamino, especially lower alkanoylamino groups such as the acetylamino group, or the benzoylamino group, arylamino, especially mononuclear carbocyclic arylamino groups such as the phenylamino group, halogens such as, especially, chlorine or bromine, the cyano, nitro or trifluoromethyl group, carboxylic acid and sulphonic acid amine groups (including those substituted at the amide nitrogen atom), carboxylic acid ester groups, especially lower alkoxy carbonyl, sulphonic acid aryl ester groups, especially mononuclear carbocyclic aryloxy-sulfonyl, hydrocarbon sulfonyl groups, especially lower alkoxy sulfonyl, such as methylsulfonyl or ethyl-sulfonyl, or phenylsulfonyl group etc. Advantageously B does not contain any substituents in the o-position to the amino- or triazene-group.

In Formulas II, III, IV, R and R′ represent, preferably a lower alkyl radical such as methyl, ethyl, n-propyl, isopropyl or n-butyl, particularly, however, methyl or ethyl.

Y in Formula IV is any anion desired, in particular a colourless one, for example the anion of an inorganic acid such as a hydrohalic acid or sulfuric acid, unesterified or mono-esterified with lower alkanols, the anion of perchloric acid or of an organic acid e.g. an arylsulfonic acid such as benzene- or p-toluene-sulfonic acid, or oxalic acid. The anion, however, can also be derived from inorganic complex acids such as zinc- or cadium-hydrohalic acid.

As amino compounds of Formula I, principally those of the 4-aminoazobenzene series but also those of the 3-aminoazobenzene series are used. The benzene nuclei can be further substituted as defined, for example, by substituents of the type given above.

Imino heterocycles of Formula II to be coupled therewith are derived, for example, from the 5- and 6-membered rings mentioned in the definition of X and *n*, supra. These are, thus, 3-imino-pyrazoline, 2-imino-imidazoline, 2-imino-thiazoline, 2-imino-oxazoline, 3-imino-1,2,4-triazoline, 2-imino-1,3,4-oxdiazoline, 2-imino-1,3,4-thiadiazoline, 2-imino-benzthiazoline, 2-imino-benzimidazoline, 3-imino-indazoline, 2-imino-dihydropyridine, 4-imino-dihydropyridine, 2 - imino - dihydroquinoline, 4-imino-dihydroquinoline, 2-imino-dihydropyrimidine or 1-imino-dihydroisoquinoline alkylated at a nitrogen atom in the heterocyclic ring; in one group of compounds according to the invention fused benzo rings in the above listed ring systems contain substituents of the type mentioned above. Preferred coupling components of Formula II are the 3-alkyl-2-imino-benzothiazolines and their benzene ring-substituted derivatives.

Coupling is performed in neutral or weakly alkaline aqueous medium; the triazene of Formula III precipitates in a form which can be easily filtered off.

Examples of esters of lower alkanols with strong acids, with which the triazene compounds of Formula III are reacted to form the colour salts of Formula IV are: methyl, ethyl, propyl or butyl chloride or the corresponding bromides or iodides, or methyl or ethyl benzene sulfonate or methyl or ethyl-p-toluene sulfonate and, in particular, dimethyl and diethyl sulfate.

The conversion of a triazene compound of Formula III into the corresponding quaternary color salt of Formula IV is advantageously performed with an excess of the alkylating agent and, advantageously, in an inert organic solvent, at a reaction temperature of about 80 to 150° C. It is often necessary to perform this conversion under pressure. Suitable solvents are, for example, unsubstituted or halogenated and/or nitrated aromatic, preferably mononuclear, hydrocarbons such as halogen benzenes or nitrobenzenes, unhalogenated or halogenated aliphatic hydrocarbons, especially halogenated lower alkanes or lower alkenes, e.g. trichloroethylene or tetrachloroethane, ketones, especially di-(lower alkyl)-ketones, such as methylethyl ketone or methylisopropyl ketone, or ethers such as dioxan.

The quaternary compounds of Formula IV are in the form of salts of the acid of the alkylating agent used for their production, i.e., for example, they are halides, methosulfates or ethosulfates. If desired, these can also be converted into salts of other acids by double decomposition reaction [Remy, Inorganic Chemistry, pp. 730–31 (1956)], for example, into oxalates, perchlorates or sulfates by the addition of aqeuous solutions of the alkali metal salts of oxalic acid or perchloric acid or sulfuric acid. Double salts can also be produced, for example, with the dyestuff halides and corresponding zinc or cadium salts.

A modification of the process for the production of triazene dyestuffs according to the invention consists in reacting, in the presence of alkali, one mol of a diazoamino compound of formula

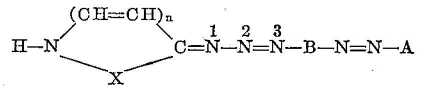
(Va)

the other resonance formula which is

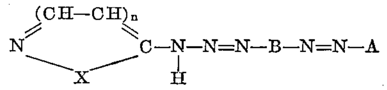
(Vb)

wherein

A represents an aryl radical which may contain substituents which do not dissociate acid in water, B represents an arylene radical which may contain substituents which do not dissociate acid in water, X represents a divalent radical which completes the nitrogen-containing ring to a five or six membered ring, and

*n* represents 0 or 1, with one mol of the ester of a low alkanol with a strong acid, to form a compound of Formula III and, if desired, converting this with at least one mol of a further ester of a low alkanol with a strong acid into a water soluble quaternary color salt of Formula IV.

Naturally, the remarks regarding A, B, X, *n*, R, R′ and Y in the first process also apply here.

The compounds of Formula V used as starting materials are obtained, for example, by coupling an aminoazo compound of Formula I with a nitrogen heterocyclic compound of the two resonance formulas

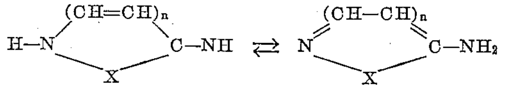

The reaction of the compound of Formula V with the alkylating agent to form the triazene compound of Formula III is advantageously performed in an organic solvent such as aliphatic ketones, esters or ethers, e.g., in acetone, methylethyl ketone or diethylketone, in ethyl acetate or in dioxan. Suitable alkaline agents for the reaction are, e.g., the sodium or potassium salts of carbonic acid.

The conversion of the triazene compounds of Formula III into color salts of Formula IV has been discussed in the first process.

Color salts of Formula IV in which R and R′ are identical can also be obtained in one step by reacting the starting materials of Formula V with an excess of the ester used as alkylating agent, alone or in the presence of an organic solvent such as, e.g., a conventional ketone, ester or ether-type solvent.

A further modification of the process for the production of water soluble quaternary color salts of triazene compounds according to the invention consists in converting a compound of formula

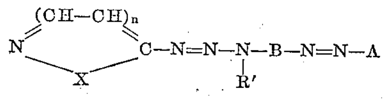
(VI)

wherein

A represents an aryl radical which may contain substituents which do not dissociate acid in water, B represents an arylene radical which may contain substituents which do not dissociate acid in water, X represents a divalent radical which completes the nitrogen-containing ring to a five- or six-membered ring, R′ represents a low alkyl radical, and

*n* represents 0 or 1, with the ester of a low alkanol with a strong acid, to form a compound of Formula IV.

In this modification also, the remarks in the first process regarding the symbols A, B, X, *n*, R, R′ and Y apply.

The compounds of Formula VI used as starting materials for this process are obtained by coupling the diazonium compound of an amino-nitrogen heterocycle of the formula

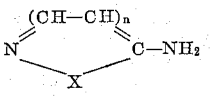

with an aminoazo compound of the formula

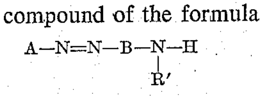

X, *n*, A, B and R′ having the meanings given above, in an aqueous medium in the presence of solubility promoters such as dimethyl formamide or acetic acid. The coupling can also be performed in an organic solvent such as in a ketone, ester or ether; preferred solvent is acetic acid.

The reaction of compounds of Formula VI with the esters used as alkylating agents to form the color salts of Formula IV is performed analogously to the conversion of the triazene compounds of Formula III into these salts described in the first process.

The triazene compounds corresponding to Formula III are difficultly soluble in water. They are suitable for the dyeing of hydrophobic organic fibers in aqueous dispersion, e.g., of cellulose di- to tri-acetate fibers; particularly, however, they are suitable for dyeing of fibers consisting of polymeric esters of aromatic polycarboxylic acids with polyvalent alcohols, for example of polyglycol terephthalates such as "Terylene," "Dacron," "Tergal," or "Trevira."

The dyestuffs can also be used, however, for the dyeing of synthetic polyamide fibers such as Nylon 6, Nylon 66 or Nylon 11.

The fibers consisting of polymeric ester compounds mentioned are dyed with aqueous dispersions of dyestuffs of Formula III according to the invention, for example, at the boiling point of the water in the presence of carriers such as phenylphenol, polychlorobenzene compounds or similar auxiliaries. Examples of dispersing agents for this purpose are, for example, polycondensation products of alkylene oxide with higher alkanols. The dyeing can also be performed, however, at higher temperatures above 100° C. under pressure. In individual cases, the drawing power of the dyestuffs can be still further improved by mixing two or more triazene dyestuffs corresponding to Formula III according to the invention.

Yellow to orange dyeings are obtained on the textile material mentioned which have good wet and light fastness properties.

The water soluble color salts of Formula IV are highly suited for the dyeing of polymeric and copolymeric acrylonitrile fibers, especially in the form of polyacrylonitrile textile fabrics, in particular of acid-modified acrylic fibers, i.e. acrylic fibers having acid sites, for instance the sulfonate-modified acrylic fibers described in U.S. Patents 2,837,500 and 2,837,501 (Orlon) and in particular of modified polyacrylonitrile fibers, especially blended polymers containing at least 80% by weight of acrylonitrile in polymeric form and the balance, preferably from 2 to 10% by weight consisting essentially of a vinyl pyridine of the type listed, e.g., in Canadian Patent 557,597, column 2, also in polymeric form ("Acrilan"). They draw onto these fibers from aqueous neutral or, preferably, from weakly acid solution, in the presence of wetting agents having a dispersing action, or without such agents on heating the open dyebath or in a closed dyebath under pressure. The dyebath is substantially to completely exhausted and the color salts according to the invention produce fast, in particular light-fast, yellow-brown to orange dyeings.

The following non-limitative examples illustrate the invention. Where not otherwise expressly stated, parts and percentages are given by weight. The temperatures are in degrees Centigrade. The relationship of parts by weight to parts by volume is as that of grams to cubic centimeters.

The salts with the anions given in the tables hereinafter in column Y are obtained by double decomposition reaction with the inorganic salts listed in said column.

*Example 1*

(A) A diazonium salt solution prepared in the usual way from 19.7 parts of 4-aminoazobenzene is poured with stirring into an acetic acid solution of 19.4 parts of 2,3-dihydro-2-imino-3-methyl-6-methoxy - benzthiazole in 200 parts of ice water.

The pH of the reaction mixture is increased to 8 by the slow drop by drop addition of aqueous sodium hydroxide solution. After about 1 hour, coupling is complete. The resulting yellow dyestuff is filtered off, washed neutral with water and dried in vacuo at 60–70°. The product is a yellow powder and corresponds to the formula

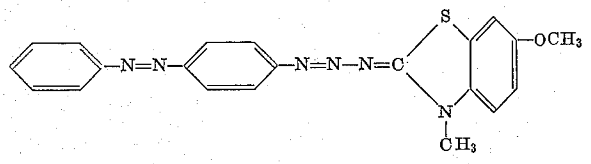

Dyestuffs having similar properties are obtained by replacing in the above example, the 19:7 parts of the diazonium compound of 4-aminoazobenzene, by equivalent amounts of the diazonium compounds of 4-amino-3,2′-dimethylazobenzene, 4 - amino-2′-chloroazobenzene, 4-amino-3′-chloroazobenzene, 4-amino - 4′-chloroazobenzene, 2 - methyl - 4 - amino - 2′,4′ - dichloroazobenzene, 2-methoxy-4-amino-2′,4′ - dichloroazobenzene, 2′,2′,4′-trichloro-4-aminoazobenzene, 3-methoxy-4-amino-6-methyl-4′-chloroazobenzene, 3,6-dimethoxy-4-aminoazobenzene, 3,6-dimethoxy-4-amino-4′-chloroazobenzene, 4-amino-2′,3′,4′-trichloroazobenzene, 2 - methyl-4-amino-2′,3′,4′-trichloroazobenzene, 4 - amino-4′ - bromoazobenzene, 2-methyl-4-amino-4′ - bromoazobenzene or 2 - methyl-4-amino-2′-trifluoromethylazobenzene.

(B) 4.0 parts of the diazoimino compound so obtained is heated for 10 minutes at 100–110° in 10 parts of dimethyl sulphate. The melt, while still warm, is taken up in 400 parts of 80°-warm water, the solution is buffered with sodium acetate until it has an acetic acid reaction and, after adding a small amount of animal charcoal, it is filtered. With the aid of zinc chloride and sodium chloride, the orange color salt is precipitated as zinc chloride double salt of the formula

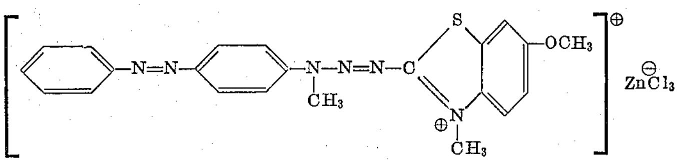

This basic dyestuff dyes polyacrylonitrile fibers such as Orlon in yellow-orange shade from an acetic acid solution. The dyeings are distinguished by their excellent fastness to washing, steam and light.

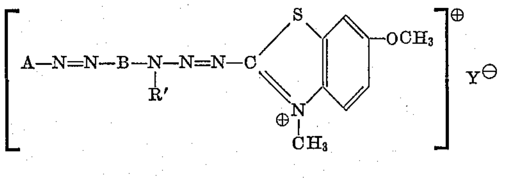

are obtained by using equivalent amounts of the coupling products obtained as described above under (A) with the alkylating agent listed in the following table under R′ and the anion listed in column Y,

| Ex. No. | B | A | Alkylating agent | R | Y |
|---|---|---|---|---|---|
| 2 | 2-methyl-1,4-phenylene | 2′-methylphenyl | Diethylsulfate | $C_2H_5$— | $C_2H_5SO_4$— |
| 3 | 1,4-phenylene | 2′-chlorophenyl | Methyliodide in chloroform | —$CH_3$ | $I^-$ |
| 4 | do | 3′-chlorophenyl | Dimethylsulfate | —$CH_3$ | $Cl^-$ |
| 5 | do | 4′-chlorophenyl | do | —$CH_3$ | $Cl^-$ |
| 6 | 2-methyl-1,4-phenylene | 2′,4′-dichlorophenyl | Diethyl sulfate | $C_2H_5$ | $C_2H_5SO_4$— |
| 7 | 2-methoxy-1,4-phenylene | do | do | $CH_3$ | $2_nCl_3$— |
| 8 | 2-chloro-1,4-phenylen | do | do | $CH_3$ | $2_nCl_3$— |
| 9 | 2-methoxy-1,4-phenylene | 4′-chlorophenyl | Methyl-p-tosylate | $CH_3$ | p-Tosylate |
| 10 | do | Phenyl | do | $CH_3$ | Do. |
| 11 | 2-methyl-1,4-phenylene | 4′-chlorophenyl | Diethylsulfate | $C_2H_5$ | $C_2H_5$—$SO_4$— |
| 12 | 1,4-phenylene | 2′,3′,4′-trichlorophenyl | do | $C_2H_5$ | $C_2H_5$—$SO_4$— |
| 13 | 2-methyl-1,4-phenylene | do | do | $C_2H_5$ | $C_2H_5$—$SO_4$— |
| 14 | 1,4-phenylen | 4′-bromophenyl | Methylbromide | $CH_3$ | $Br^-$ |
| 15 | 2-methyl-1,4-phenylen | do | Diethylsulfate | $C_2H_5$ | $Cl^-$ |
| 16 | 2-methyl-1,4-phenylene | 2′-trifluoromethylphenyl | do | $C_2H_5$ | With NaCl |

*Example 17*

(A) A solution of 3.9 parts of sodium nitrite in 20 parts of water is poured, while stirring vigorously, into a fine suspension of 10.7 parts of 4-amino-4′-hydroxyazobenzene in a mixture of 200 parts of water, 20 parts of concentrated hydrochloric acid and 0.1 part of a fatty alcohol/polyethylene oxide condensation product and the mass is kept for 1 hour at room temperature. Any excess nitrite present is decomposed by the addition of sulfamic acid. The clarified diazonium salt solution is poured into an acetic acid solution of 12.2 parts of 2-amino-3-ethyl-6-methoxybenzthiazolium chloride in 200 parts of water. The reaction mixture is neutralised by the dropwise addition of dilute sodium hydroxide solution, whereupon the dyestuff of the formula

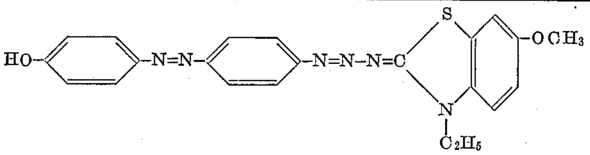

precipitates. On completion of the coupling, the yellow diazoimino compound is filtered off, washed neutral with water and dried in vacuo at 60°.

The product dyes polyester fibers made from polyglycol terephthalate such as "Trevira" in pure yellow-orange shades from an aqueous dispersion.

By using in the above example, with otherwise the same procedure, instead of the 10.7 parts of 4-amino-4′-hydroxyazobenzene the equivalent amounts of 4 - amino - 3′ - hydroxyazobenzene, 4 - amino-4′-methoxyazobenzene, 2-methyl - 4 - amino-4′-methoxyazobenzene, 2-chloro-4-amino-4′-methoxyazobenzene, 4-amino-3′methoxyazobenzene, 4 - amino-2′-methoxyazobenzene-4-amino-2′-4′-dimethoxyazobenzene, 4 - amino - 2′,5′-dimethoxyazobenzene, 4-amino-2′-methoxy - 5′ - methylazobenzene, 4-amino - 4′ - acetylaminoazobenzene, 2 - methyl - 4 - amino - 4′ - acetylaminoazobenzene, then other yellow-orange dyestuffs having similar dyeing properties are obtained.

(B) A mixture of 4.3 parts of the diazoimino compound obtained according to paragraph A and 10 parts of freshly distilled diethyl sulphate are heated to 120° within 10 minutes and kept at this temperature for a further 10 minutes. The still warm melt is worked up as described in paragraph B of Example 1. The orange color salt of the formula

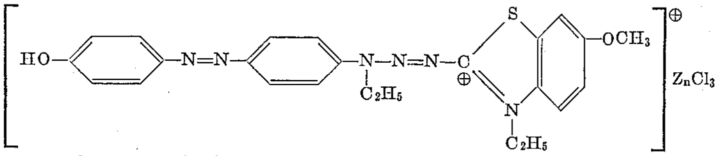

so obtained dyes polyacrylonitrile fibers from an acetic acid solution in orange shades. The bath is substantially exhausted. The dyeings have excellent fastness to washing, steam and light.

On using dimethyl sulphate instead of diethyl sulphate, an orange colour salt is obtained which has similar dyeing properties.

Similar color salts are obtained by using equivalent amounts of coupling products obtained as described above under (A) with the alkylating agent listed in the following table under R′ and the anion listed in column Y;

| Ex. No. | B | A | Alkylating agent | R′ | Y |
|---|---|---|---|---|---|
| 18 | 1,4-phenylene | 3′-hydroxyphenyl | Diethylsulfate | —$C_2H_5$ | $Cl^-$ with NaCl |
| 19 | do | 4′-methoxyphenyl | Methyl bromide | —$CH_3$ | $Br^-$ |
| 20 | 2-methyl-1,4-phenylene | do | Diethylsulfate | —$C_2H_5$ | $C_2H_5$—$SO_4$— |
| 21 | 2-chloro-1,4-phenylene | do | Dimethylsulfate | —$CH_3$ | $ZnCl_3^-$ |
| 22 | 1,4-phenylene | 3′-methoxyphenyl | Methyl-p-tosylate | —$CH_3$ | p-Tosylate |
| 23 | do | 2′-methoxyphenyl | Methyliodide (in chloroform) | —$CH_3$ | $I^-$ |
| 24 | do | 2′,4′-dimethoxyphenyl | Diethyl sulfate | —$C_2H_5$ | $C_2H_5SO_4$— |
| 25 | do | 2′,5′-dimethoxyphenyl | do | —$C_2H_5$ | $C_2H_5SO_4^-$ |
| 26 | do | 2′-methoxy-5′methylphenyl | do | —$C_2H_5$ | $C_2H_5SO_4^-$ |
| 27 | do | 4′-acetylaminophenyl | Dimethylsulfate | —$CH_3$ | $ZnCl_3^-$ |
| 28 | 2-methyl-1,4-phenylene | do | do | —$CH_3$ | $CH_3SO_4^-$ |

*Examples 29 to 37*

A solution of 3.9 parts of sodium nitrite in 20 parts of water is poured, while stirring vigorously, into a fine suspension of 10.7 parts of 4-amino-4′-hydroxyazobenzene in a mixture of 200 parts of water, 20 parts of concentrated hydrochloric acid and 0.1 part of a fatty alcohol/polyethylene oxide condensation product and the mass is kept for 1 hour at room temperature. Any excess nitrite present is decomposed by the addition of sulfonic acid.

By pouring in the clarified diazonium salt solution in to an acetic acid solution of the 2-amino-3-ethyl-6-methoxybenzthiazolium chloride used in Example 17, an acetic acid solution of 11.5 parts of 2-amino-3-methyl-6-methoxy-benzthiazolium chloride, 12.9 parts of 2-amino-3-n-propyl-6-methoxybenzthiazolium chloride, 13.6 parts of 2-amino-3-n-butyl-6-methoxybenzthiazolium chloride, 14.4 parts of 2-amino - 3 - carbomethoxymethyl-6-methoxybenzthiazolium chloride, 26.6 parts 2-amino-3-(N,N-dimethyl-carbamyl-methyl)-benzthiazolium chloride 25.6 parts 2-amino-3-(3-carbamylethyl)-benzthiazolium chloride, 15.1 parts of 2-amino-3-carbethoxymethyl-6-methoxybenzthiazolium chloride, 13.6 parts of 2-amino-3-carbamylmethyl - 6 - methoxybenzthiazolium chloride, 14.3 parts of 2 - amino - 3 - methylcarbamylmethyl-6-methoxybenzthiazolium chloride, 15.1 parts of 2-amino-3-carbonethoxyethyl-6-methoxybenzthiazolium chloride, 15.0 parts of 2-amino - 3 - methylcarbamoylmethyl-6-methoxybenzthiazolium chloride respectively there are obtained the yellow-orange cationic dyestuffs of the formula

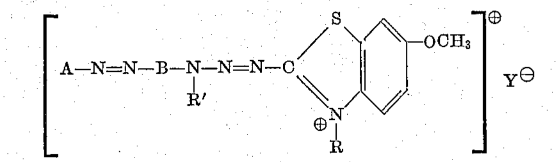

listed in table.

no-3-methyl-(1,3,4)-thiadiazolium- or 2-amino-3,5-dimethyl-(1,3,4)-thiadiazolium-methosulphate can be used and diazoimino compounds having similar properties are obtained.

(B) 7.3 parts of the diazoimino compound obtained according to paragraph A are heated for 30 minutes at 110° with 3.0 parts of dimethyl sulphate in 250 parts of tetrachloroethane. To remove the organic solvent, 300 parts of hot water are added and the reaction mixture is subjected to steam distillation. The aqueous solution of the dyestuff so obtained is clarified hot and the yellow-orange color salt is precipitated with the aid of zinc chloride and sodium chloride. It has the formula

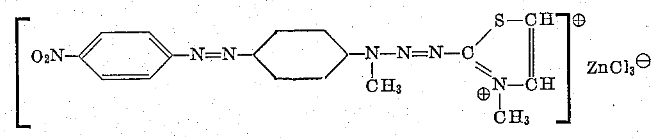

| Ex No. | R | A | B | Alkylating agent | R′ | Y |
|---|---|---|---|---|---|---|
| 29 | $-CH_3$ | 4′-hydroxyphenyl | 1,4-phenylene | dimethylsulfate | $-CH_3$ | $CH_3SO_4-$ |
| 30 | $-n-C_3H_7$ | do | do | Methyliodide (in chloroform) | $-CH_3$ | I- |
| 31 | $-n-C_4H_9$ | do | do | Dimethylsulfate | $-CH_3$ | $ZnCl_3^-$ |
| 32 | $-CH_2-COO-CH_3$ | do | do | Diethyl sulfate | $-C_2H_5$ | $C_2H_5SO_4^-$ |
| 33 | $-CH_2-COO-C_2H_5$ | do | do | do | $-C_2H_5$ | $C_2H_5SO_4^-$ |
| 34 | $-CH_2-CO-NH_2$ | do | do | Methyl-p-tosylate | $-CH_3$ | p-Tosylate |
| 35 | $-CH_2-CO-NH-CH_3$ | do | do | do | $-CH_3$ | Do. |
| 36 | $-C_2H_4-COO-CH_3$ | do | do | Methyl bromide | $-CH_3$ | Br- |
| 37 | $-C_2H_4-CO-NH-CH_3$ | do | do | Diethyl sulfate | $-C_2H_5$ | Cl- (with NaCl) |

*Example 38*

(A) 12.1. parts of 4-amino-4′-nitroazobenzene are finely distributed in a mixture of 200 parts of water, 20 parts of concentrated hydrochloric acid and 0.2 part of a non-ionogenic condensation product of fatty alcohols having 14 to 18 carbon atoms and 25 equivalents of ethylene oxide, and are then diazotised in the usual way with 3.9 parts of sodium nitrite in 20 parts of water. The clarified diazonium salt solution is poured into the acetic acid solution of 11.3 parts of 2-amino-3-methyl-thiazolium methosulphate in 200 parts of water and the pH of the coupling mass is adjusted to 8 by the dropwise addition of dilute sodium hydroxide solution. The yellow dyestuff of the formula

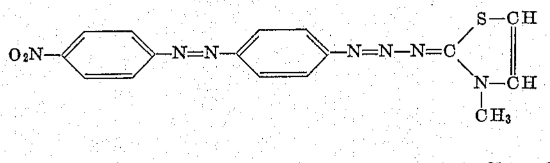

precipitates. On completion of the coupling, it is filtered off, washed neutral with water and dried in vacuo at 60–70°.

Similar yellow dyestuffs are obtained on using equivalent amounts of 2-amino-4-methyl-4-methoxythiazolium chloride (9.0 parts), 2-amino-3,4-dimethylthiazolium chloride (8.2 parts), 2-amino-3-ethyl-4-phenylthiazolium ethosulphate (16.5 parts), 2-amino-3,4,5-trimethylthiazolium chloride (8.9 parts) or 2-amino-3-methyl-4,5-diphenylthiazolium chloride (15.2 parts). Instead of 2-aminothiazole derivatives, also the corresponding amounts of 2-ami- From an acetic acid bath, it dyes polyacrylonitrile fibers such as Dralon, in yellow-orange shades. The bath is substantially exhausted. The dyeings have very good wet and light fastness properties.

Similar yellow cationic dyestuffs of the formula

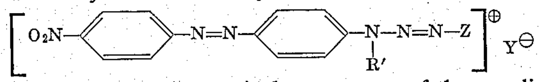

are obtained by using equivalent amounts of the coupling products obtained as above under (A) with the alkylating agent listed in the following table under R′ and the anion listed under Y, A and B being in all cases the same as in Example 38.

| Ex. No. | Z | Alkylating agent | R′ | Y |
|---|---|---|---|---|
| 39 | 3-methyl-4-methoxy-thiazolyl-(2) | Diethylsulfate | $-C_2H_5$ | $C_2H_5SO_4^-$ |
| 40 | 3,4-dimethylthiazolyl-(2) | Dimethylsulfate | $-CH_3$ | $CH_3SO_4^-$ |
| 41 | 3-ethyl-4-phenylthiazolyl-(2) | do | $-CH_3$ | $ZnCl_3^-$ |
| 42 | 3,4,5-trimethylthiazolyl-(2) | Methylbromide | $-CH_3$ | Br- |
| 43 | 3-methyl-4,5-diphenylthiazolyl-(2) | Dimethylsulfate | $-CH_3$ | Cl-(with NaCl) |
| 44 | 3-methyl-1,3,4-thiadiazolyl-(2) | Methyl-p-tosylate | $-CH_3$ | p-Tosylate |
| 45 | 3,5-dimethyl-1,3,4-thiadiazolyl-(2) | Diethylsulfate | $-C_2H_5$ | $C_2H_5SO_4^-$ |

*Example 46*

(A) A slurry of 13.3 parts of finely distributed 4-amino-4′-methylsulphonylazobenzene in a mixture of 200 parts of water, 20 parts of concentrated hydrochloric acid and 0.2 part of a fatty alcohol-polyethylene oxide condensation product is diazotised in the usual way by the addition dropwise of a solution of 3.9 parts of sodium nitrite in 20 parts of water. A solution of 9.9 parts of 2,3-dihydro-2-imino-3-methyl-6-chloro-benzthiazole in 200 parts of 10% acetic acid is poured into the clarified solution of the diazonium salt so obtained and the pH of the coupling mass is adjusted to 8 by the addition of dilute sodium hydroxide solution. On completion of the coupling the yellow dyestuff is filtered off, washed neutral with water and dried in vacuo at 60–70°. The product has the formula

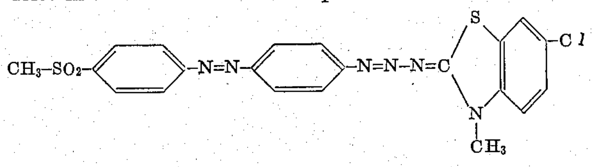

Similar products are obtained on using equivalent amounts of the diazo components given in column 2 with the imines given in column 3 of the following table instead of the starting materials given above.

TABLE I

| No. | Diazo component | Coupling component | Shade on polyester fibres |
|---|---|---|---|
| 1 | 4-amino-4'-methylsulphonylazobenzene | 2,3-dihydro-2-imino-3-methyl-benzthiazole | Yellowish orange. |
| 2 | 4-amino-4'-nitroazobenzene | 2,3-dihydro-2-imino-3-ethyl-6-chlorobenzthiazole | Do. |
| 3 | do | 2,3-dihydro-2-imino-3-methyl-6-bromo-benzthiazole | Do. |
| 4 | 4-amino-2'-methoxy-4'-nitroazobenzene | 2,3-dihydro-2-imino-3-methyl-6-methoxybenzthiazole | Orange. |
| 5 | 2-methyl-4-amino-4'-nitroazobenzene | 2,3-dihydro-2-imino-3,6-dimethyl-benzthiazole | Do. |
| 6 | 4-amino-3'-cyanoazobenzene | 2,3-dihydro-2-imino-3-ethyl-6-methoxybenzthiazole | Do. |
| 7 | 2-methoxy-4-amino-4'-nitroazobenzene | 2,3-dihydro-2-imino-3-methyl-6-ethoxybenzthiazole | Do. |
| 8 | 4-amino-4'-methylsulphonylazobenzene | 2,3-dihydro-2-imino-3-methyl-5-methoxybenzthiazole | Yellowish orange. |
| 9 | 4-amino-4'-nitroazobenzene | 2,3-dihydro-2-imino-3-methyl-6-acetylaminobenzthiazole | Orange. |
| 10 | 4-aminoazobenzene | 2,3-dihydro-2-imino-3-methylsulphonylbenzthiazole | Yellowish orange. |

(B) 4.9 parts of the dyestuff obtained according to paragraph A are mixed for 20 minutes with 20 parts of p-toluene sulphonic acid methyl ester and the mixture is heated at 100–110°. The melt, while still warm, is poured into 400 parts of 80° warm water, sodium acetate is added until the reaction is acetic acid and, after a little animal charcoal has been added, it is filtered. The yellow-orange color salt is precipitated with the aid of zinc chloride and sodium chloride as the zinc chloride double salt. It has the formula

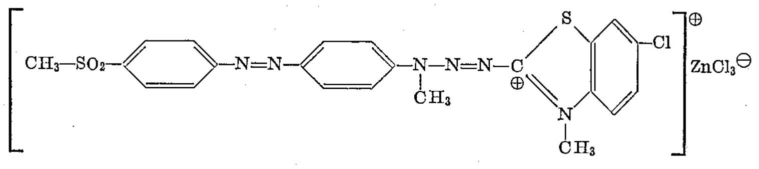

The basic dyestuff so obtained dyes polyacrylonitrile fibers such as "Acrilan" from an acetic acid solution in yellow-orange shades. The dyeings are distinguished by their good wet and light fastness properties.

The same colour salt is also obtained if the dyestuff obtained according to paragraph A is heated for 1 hour under pressure at 100–110° in methanol with excess methyl iodide and the reaction mixture is worked up as above.

Similar cationic colour salts of the formula $$[A{-}N{=}N{-}B{-}\underset{CH_3}{\underset{|}{N}}{-}N{=}N{-}Z^{+\oplus}]ZnCl_3^{\ominus}$$

wherein A, B and Z have the meanings listed in the following table, are obtained by methylating the diazoimino compounds produced as described under (A) and precipitating the color as the zinc chloride double salt as described under (B)

| Ex. No. | A | B | Z |
|---|---|---|---|
| 47 | 4'-methylsulfonylphenyl | 1,4-phenylene | 3-methyl-benzthiazolyl-(2)- |
| 48 | 4'-nitrophenyl | do | 3-ethyl-6-chlorobenzthiazolyl-(2)- |
| 49 | do | do | 3-methyl-6-bromobenzthiazolyl-(2)- |
| 50 | 2'-methoxy-4'-nitrophenyl | do | 3-methyl-6-methoxybenzthiazolyl-(2)- |
| 51 | 4'-nitrophenyl | 2-methyl-1,4-phenylene | 3,6-dimethylbenzthiazolyl-(2)- |
| 52 | 3'-cyanophenyl | 1,4-phenylene | 3-ethyl-6-methoxybenzthiazolyl-(2)- |
| 53 | 4'-nitrophenyl | 2-methyoxy-1,4-phenylene | 3-methyl-6-ethoxybenzthiazolyl-(2)- |
| 54 | 4'-methylsulfonyl phenyl | 1,4-phenylene | 3-methyl-5-methoxybenzthiazolyl-(2)- |
| 55 | 4'-nitrophenyl | do | 3-methyl-6-acetylamino benzthiazolyl-(2)- |
| 56 | Phenyl | do | 3-methylsulfonylbenzthiazolyl-(2)- |
| 57 | 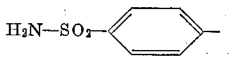 | 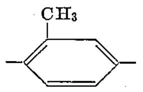 | 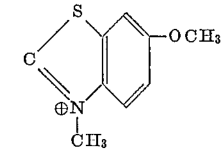 |
| 58 | 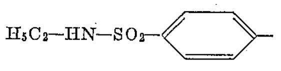 | 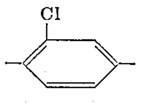 | 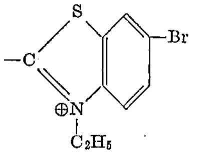 |
| 59 | 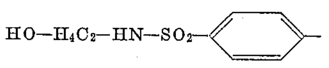 | 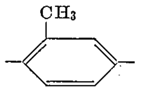 | 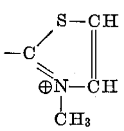 |
| 60 | 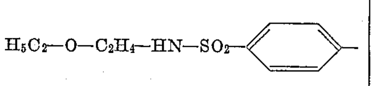 | 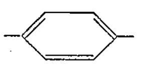 | 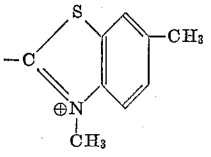 |

| Ex. No. | A | B | Z |
|---|---|---|---|
| 61 | 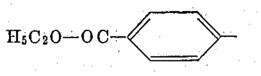 | 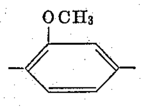 | 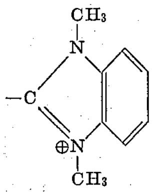 |
| 62 | 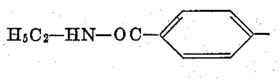 | 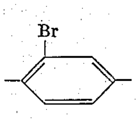 | 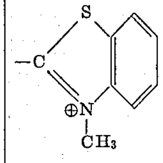 |
| 63 | 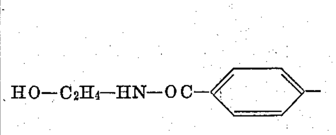 | 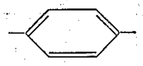 | 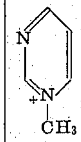 |
| 64 | 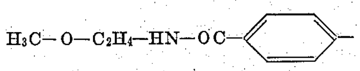 | 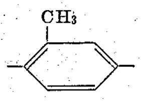 | 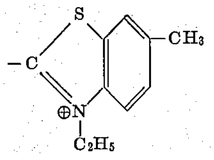 |

*Example 65*

(A) 19.7 parts of 4-aminoazobenzene are diazotised in the usual way. The clarified diazo solution is poured into a solution of 10.8 parts of 1,2-dihydro-1-methyl-2-iminopyridine in 300 parts of ice water which has been acidified with hydrochloric acid, the reaction mixture is neutralised by the gradual addition of sodium hydroxide solution and, on completion of the coupling, the yellow triazene compound is filtered off, washed and dried. The product so obtained is a yellow powder of the formula

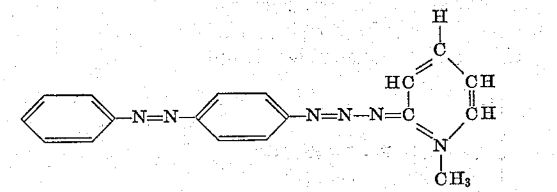

If instead of 1,2-dihydro-1-methyl-2-iminopyridine, 1,4-dihydro-1-methyl-4-iminopyridine, 1,2-dihydro-1-methyl-2-iminoquinoline or 1,2-dihydro-1-imino-2-methyl-isoquinoline is used, then products having similar properties are obtained.

(B) 7.3 parts of the yellow dyestuff produced according to paragraph A are converted as described in paragraph B of Example 1 with dimethyl sulphate into the corresponding yellow-orange colour salt of the formula

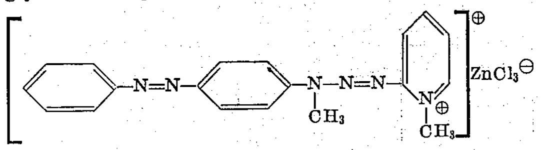

and this is worked up as described in paragraph B of Example 1.

Similar dyestuffs of the formula

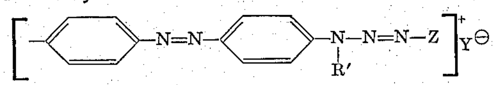

are obtained by using equivalent amounts of the coupling component Z listed below with the alkylating agent listed in the following table under R′ and Y.

| Ex. No. | Z | Alkylating agent | R′ | Y |
|---|---|---|---|---|
| 66 | 1-methyl-pyridyl-(4) | Diethylsulfate | $-C_2H_5$ | $C_2H_5SO_4-$ |
| 67 | 1-methyl-quinolinyl-(2) | Dimethylsulfate | $-CH_3$ | $ZnCl_3^-$ |
| 68 | 2-methyl-quinolinyl-(1) | Methylbromide | $-CH_3$ | $Br^-$ |

*Example 69*

(A) a dispersion of 11.4 parts of 4-amino-4′-methoxy-azobenzene in a mixture of 200 parts of water, 20 parts of concentrated hydrochloric acid and 0.2 part of a dispersing agent is diazotised at room temperature with 3.9 parts of sodium nitrite in 20 parts of water. The clarified diazonium salt solution is poured into a hydrochloric acid solution of 8.0 parts of 2,3-dihydro-1,3-dimethyl-2-iminobenzimidazole and the reaction solution is carefully neutralised. After stirring for a longer time, the yellow triazene compound is filtered off under suction and dried. It has the formula

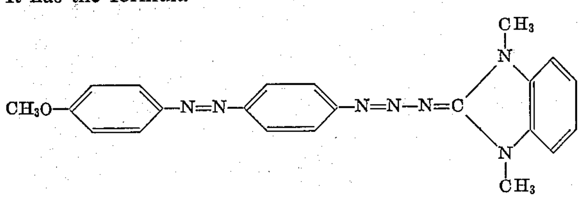

The coupling product of the above diazo component with 2,3-dihydro-1,2-dimethyl-3-iminoindazole is a similar product.

(B) 4.0 parts of the triazene compound obtained according to paragraph A are methylated with 10 parts of dimethyl sulphate by the process described in paragraph B of Example 1 and the product is worked up as there described. The color salt so obtained dissolves in water with a reddish yellow colour. It has the formula

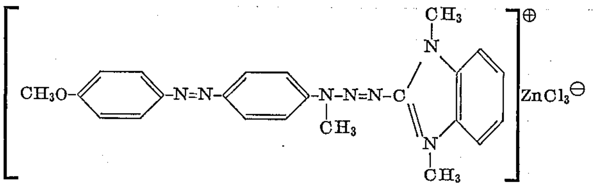

Colour salts having similar properties are obtained by methylating or ethylating the other triazene compounds obtainable according to paragraph A of this example.

*Example 70*

(A) The diazo solution prepared in the usual way from 19.7 parts of 4-aminobenzene is poured, while stirring well, into a mixture of 18.0 parts of 2-amino-6-methoxy-benzthiazole, 100 parts of glacial acetic acid and 300 parts of finely crushed ice. The solution is carefully neutralised with sodium hydroxide solution while cooling, so that the pH of the reaction mixture finally is 7–7.5. After stirring a considerable time, the precipitated yellow triazene compound is filtered off under suction, washed and dried. It corresponds to the formula

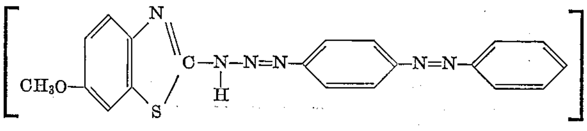

A suspension of 3.9 parts of this dyestuff in 10 parts of dimethyl sulphate is heated for 5 minutes at 100°. While still warm, the melt is taken up in 400 parts of warm water, the solution is buffered with sodium acetate until it has an acetic acid reaction when, after the addition of a little animal charcoal, it is filtered. The orange colour salt is precipitated with the aid of zinc chloride and sodium chloride. It is identical with the product described in paragraph B of Example 1.

(B) 7.8 parts of the triazene produced according to paragraph A of the formula

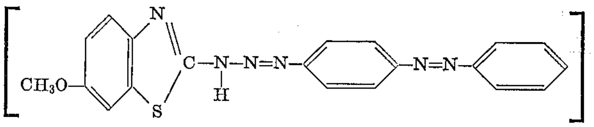

and 3.6 parts of most finely pulverised potassium carbonate in 150 parts of ethylmethyl ketone are boiled for 30 minutes. A solution of 2.7 parts of dimethyl sulphate in 20 parts of ethylmethyl ketone is then added dropwise and the whole is kept for another 30 minutes at the boil. After cooling the reaction mixture, it is poured into 4000 parts of water, the precipitate is filtered off and washed with water until the filtrate has a neutral reaction. The product is identical to that described in paragraph A of Example 1.

4.0 parts of this monoalkylation product are heated for 5 minutes at 100° with 10 parts of dimethyl sulphate and the melt, while still warm, is worked up analogously to the process given in paragraph A. The orange colour salt so obtained is identical with the quarternised end product of paragraph A.

*Example 71*

(A) A solution of 10.7 parts of 3-amino-4'-hydroxyazobenzene is added dropwise while stirring vigorously to a mixture of 200 parts of water, 20 parts of concentrated hydrochloric acid and 0.1 part of non-ionogenic dispersing agent such as, e.g. the condensation product of a higher fatty alcohol and more than 10 equivalents of ethylene oxide. The suspension so obtained is diazotised at room temperature in the usual way with 3.9 parts of sodium nitrate. The clarified diazonium salt solution is poured into an acetic acid solution of 11.5 parts of 2-amino-3-ethyl-6-methoxybenzthiazolium chloride in 200 parts of water. The reaction mixture is neutralised by the dropwise addition of dilute sodium hydroxide solution whereupon the dyestuff of the formula

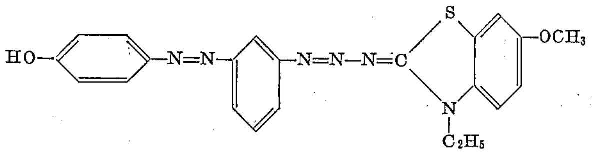

begins to precipitate. On completion of the coupling, the yellow diazoimino compound is filtered off under suction, washed neutral with water and dried in vacuo at 60–70°.

By replacing in the above example with otherwise the same procedure, instead of 10.7 parts of 3-amino-4'-hydroxyazobenzene, the equivalent amounts of 3-amino-3'-hydroxyazobenzene, 3-amino-4' - methoxyazobenzene, 3-amino-3' - methoxyazobenzene, 3-amino-2'-methyl-4'-acetylaminobenzene, 3-amino-3'-methyl-4'-hydroxyazobenzene or 3-amino-2'-methyl-4'-hydroxybenzene are used.

(B) A mixture of the diazoimino compound obtained according to paragraph A and 10 parts of dimethyl sulphate are heated within 10 minutes to 110° and kept for 5 minutes at this temperature. The melt, while still warm, is worked up as described in paragraph B of Example 1. The yellow-orange color salt so obtained, of the formula

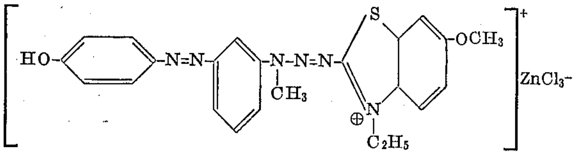

dyes polyacrylonitrile fibers from an acetic acid bath in yellow-orange shades. The dyeings are very fast. The same dyestuff is obtained on using p-toluene sulphonic acid methyl ester instead of dimethyl sulfate.

Similar color salts of the formula

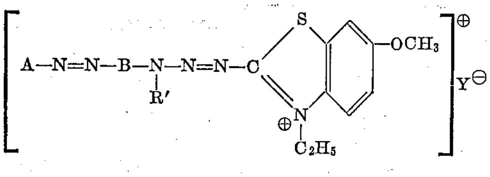

are obtained by using equivalent amounts of the coupling products obtained as described under (A) with the alkylating agent listed in the following table under R' and the anion listed in column Y.

| Ex. No. | A | B. | Alkylating agent | R' | Y |
|---|---|---|---|---|---|
| 72 | 3'-hydroxyphenyl | 1,3-phenylene | Methyl-p-tosylate | $-CH_3$ | p-Tosylate |
| 73 | 4'-methoxyphenyl | do | Diethylsulfate | $-C_2H_5$ | $-C_2H_5SO_4-$ |
| 74 | 3'-methoxyphenyl | do | do | $-C_2H_5$ | $ZnCl_3-$ |
| 75 | 2'-methyl-4'-acetylamino-phenyl | do | Dimethylsulfate | $-CH_3$ | $Cl^-$ (with NaCl) |
| 76 | 3'-methyl-4'-hydroxyphenyl | do | do | $-CH_3$ | $-CH_3SO_4^-$ |
| 77 | 2'-methyl-4'-hydroxyphenyl | do | Methylbromide | $-CH_3$ | Br |

*Example 78*

The diazonium salt solution produced from 18 parts of 2-amino-6-methoxybenzthiazole, 200 parts of 95% acetic acid, 20 parts of concentrated sulphuric acid and nitrosyl sulphuric acid, corresponding to 6.9 parts of sodium nitrite, is poured at 0–5°, while stirring, into the solution of 21.1 parts of 4-N-methylaminoazobenzene in 150 parts of acetic acid. The sulphuric acid is buffered by the addition of sodium acetate and then the reaction mass is stirred for 3 hours at room temperature when it is finally poured into a liter of water. The yellow diazoimino compound precipitates. It is filtered off under suction, washed with a great deal of water and dried in vacuo.

4.0 parts of the triazene so obtained are heated for 10 minutes in 10 parts of pure dimethyl sulphate at 100–110° and the procedure given in Example 1 paragraph B is followed. The color salt so obtained is identical with the product described in paragraph B of Example 1.

A similar product is obtained on using the equivalent amount of 4-ethylaminoazobenzene in the process described above.

*Example 79*

Polyacrylonitrile fibers are dyed with the water soluble color salts produced according to the above examples as follows:

0.5 part of the dyestuff obtained according to Example 1 paragraph B are pasted with 0.5 part of 80% acetic acid and brought into solution by the addition of 4000 parts of hot water. One further part of 80% acetic acid, 2 parts of sodium acetate and 4 parts of a condensation product of olein alcohol and 15 mols of ethylene oxide are added and 100 parts of "Orlon 42" are introduced. The bath is heated within 30 minutes to 90°, kept at this temperature for 10 minutes and dyeing is then performed at the boil for 1 hour. The dyebath is almost completely exhausted. The goods so treated are then soaped for 15 minutes at 80° in 5000 parts of water with the addition of a sulphonated fatty acid condensation product, rinsed and dried. The polyacrylonitrile fiber is dyed in pure orange shades of excellent fastness to washing and light.

We claim:

1. A water-soluble cationic dyestuff of the formula $$\left[ Z=\overset{1}{N}-\overset{2}{N}=\underset{R'}{\overset{3\oplus}{N}}-B-N=N-A \right]^{\oplus} Y^{\ominus}$$

wherein

A is a member selected from the group consisting of phenyl, lower alkyl-phenyl, chloro-phenyl, bromo-phenyl, trifluoromethyl-phenyl, mono-hydroxy-phenyl, lower alkoxy-phenyl, lower alkanoylamino-phenyl, nitro-phenyl, cyano-phenyl, lower alkyl-sulfonyl-phenyl, sulfamyl-phenyl, N-lower alkyl-substituted sulfamyl-phenyl, N-hydroxy-lower alkyl-substituted sulfamyl-phenyl, N-lower alkoxy-lower alkyl-substituted sulfamyl-phenyl, lower alkoxy-carbonyl-phenyl, carbamyl-phenyl, N-lower alkyl-substituted carbamyl-phenyl, N-hydroxy-lower alkyl-substituted carbamyl-phenyl, and N-lower alkoxy-lower alkyl-substituted carbamyl-phenyl;

B is a divalent radical selected from the group consisting of phenylene, lower alkylphenylene, lower alkoxy-phenylene, chloro-phenylene and bromo-phenylene;

Z is an N-lower alkyl-substituted cyloammonium radical, the cycloammonium moiety of which is a member selected from the group consisting of 1,2-thiazolyl-(3), 1,3-thiazolyl-(2), 1,3,4-thiadiazolyl-(2), indazolyl-(3), imidazolyl-(2), benzimidazolyl-(2), pyridyl-(2), pyridyl-(4), benzthiazolyl-(2), quinolyl-(2), quinolyl-(4), iso-quinolyl-(1), and pyrimidinyl-(2), and wherein the N-substituent R' is lower alkyl, and Y represents an uncoloured anion, the triazene group of said dyestuff being linked to B in one of the positions meta and para to the azo bridge, said dyestuff being free from salt-forming groups which dissociate acid in water.

2. The compound of the formula

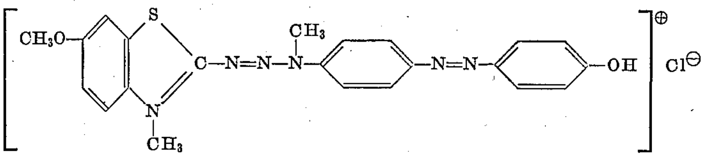

3. The compound of the formula

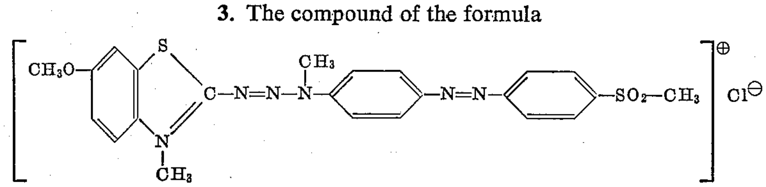

4. The compound of the formula

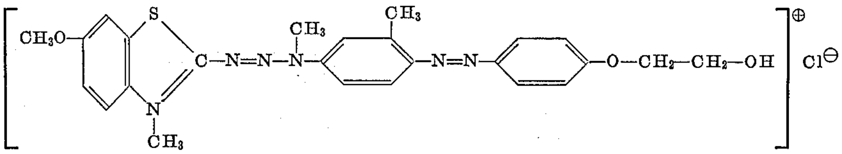

5. The compound of the formula

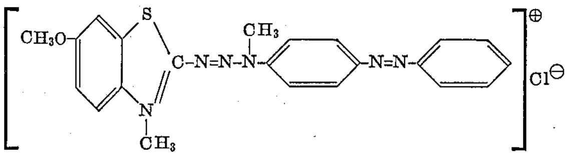

6. The compound of the formula

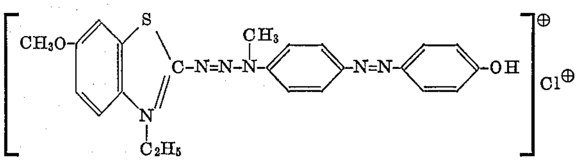

References Cited by the Examiner

UNITED STATES PATENTS 3,055,881 9/1962 Voltz et al. ---------- 260—140

CHARLES B. PARKER, *Primary Examiner.*

I. MARCUS, *Examiner.*

N. S. MILESTONE, *Assistant Examiner.*